(12) United States Patent
Frengut et al.

(10) Patent No.: US 7,599,851 B2
(45) Date of Patent: Oct. 6, 2009

(54) METHOD FOR PROVIDING CUSTOMIZED USER INTERFACE AND TARGETED MARKETING FORUM

(76) Inventors: Renee Frengut, 2000 N. Ocean Blvd., Suite 102, Boca Raton, FL (US) 33431; John Burdick, 3000 E. Sunrise Blvd., Suite 2A, Ft Lauderdale, FL (US) 33304; John Bellantoni, 2000 N. Ocean Blvd., Suite 102, Boca Raton, FL (US) 33431

( * ) Notice: Subject to any disclaimer, the term of this patent is extended or adjusted under 35 U.S.C. 154(b) by 1759 days.

(21) Appl. No.: 09/825,269

(22) Filed: Apr. 3, 2001

(65) Prior Publication Data

US 2002/0046099 A1 Apr. 18, 2002

(51) Int. Cl.
*G06Q 30/00* (2006.01)
(52) U.S. Cl. ..................................... 705/14
(58) Field of Classification Search ................. 705/14
See application file for complete search history.

(56) References Cited

U.S. PATENT DOCUMENTS 5,848,396 A * 12/1998 Gerace ........................ 705/10
6,119,101 A   9/2000 Peckover ..................... 705/26
6,236,978 B1 * 5/2001 Tuzhilin ...................... 705/26

OTHER PUBLICATIONS

Definition of "profile" (noun), Merriam-Webster's Collegiate Dictionary accessed at http://www.search.eb.com/dictionary, Apr. 30, 2005.*

* cited by examiner

*Primary Examiner*—Donald L Champagne
(74) *Attorney, Agent, or Firm*—Daniel S. Polley, P.A.

(57) ABSTRACT

A method for providing customized network interface and targeted marketing forum. Consumers are provided with a graphical interface tailored in appearance and content based solely on the consumer's specifications. In addition, advertisers and other commercial entities are provided with a targeted audience of consumers having an increased likelihood of interest in the advertisement or commercial object.

17 Claims, 10 Drawing Sheets

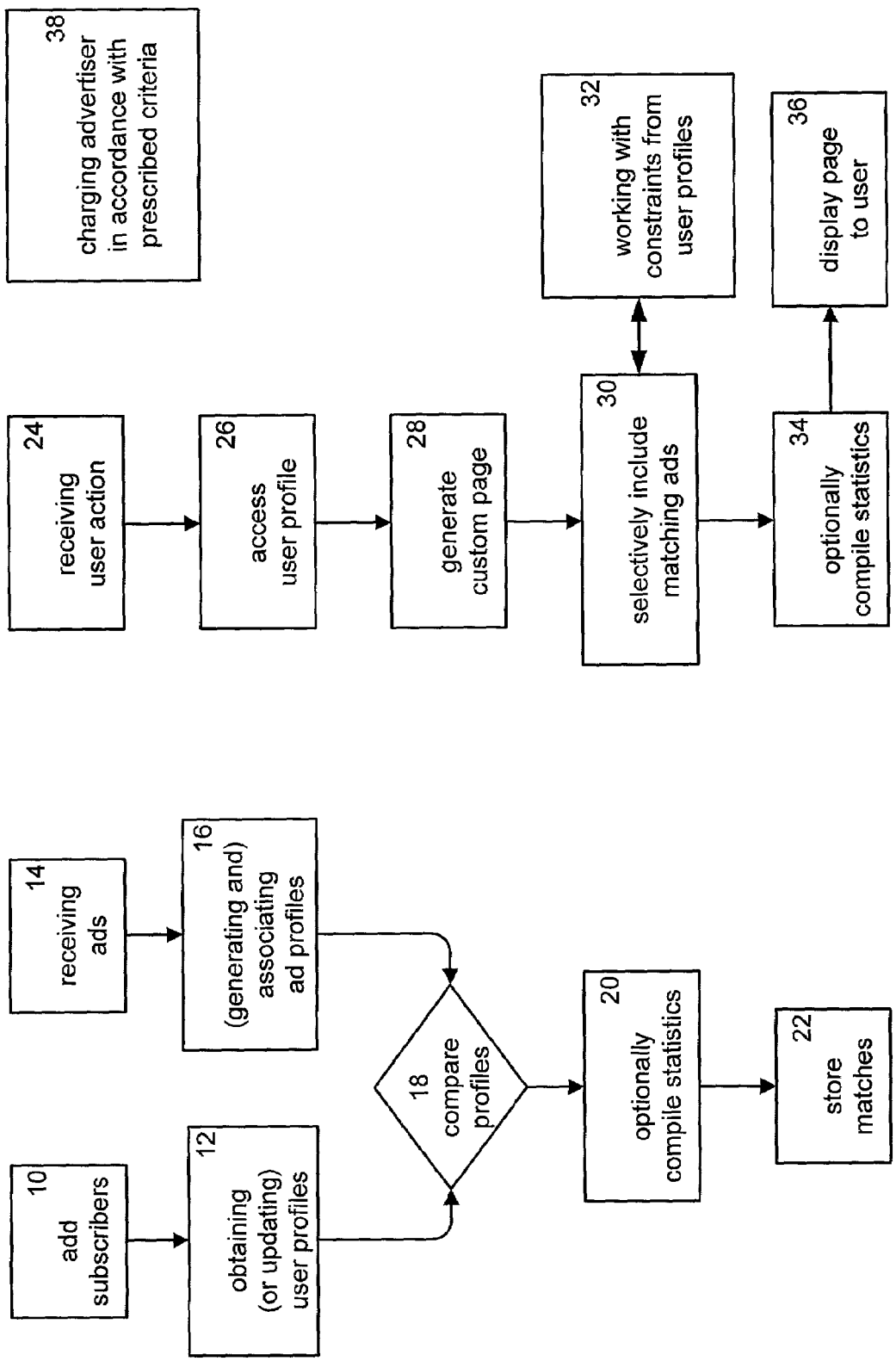

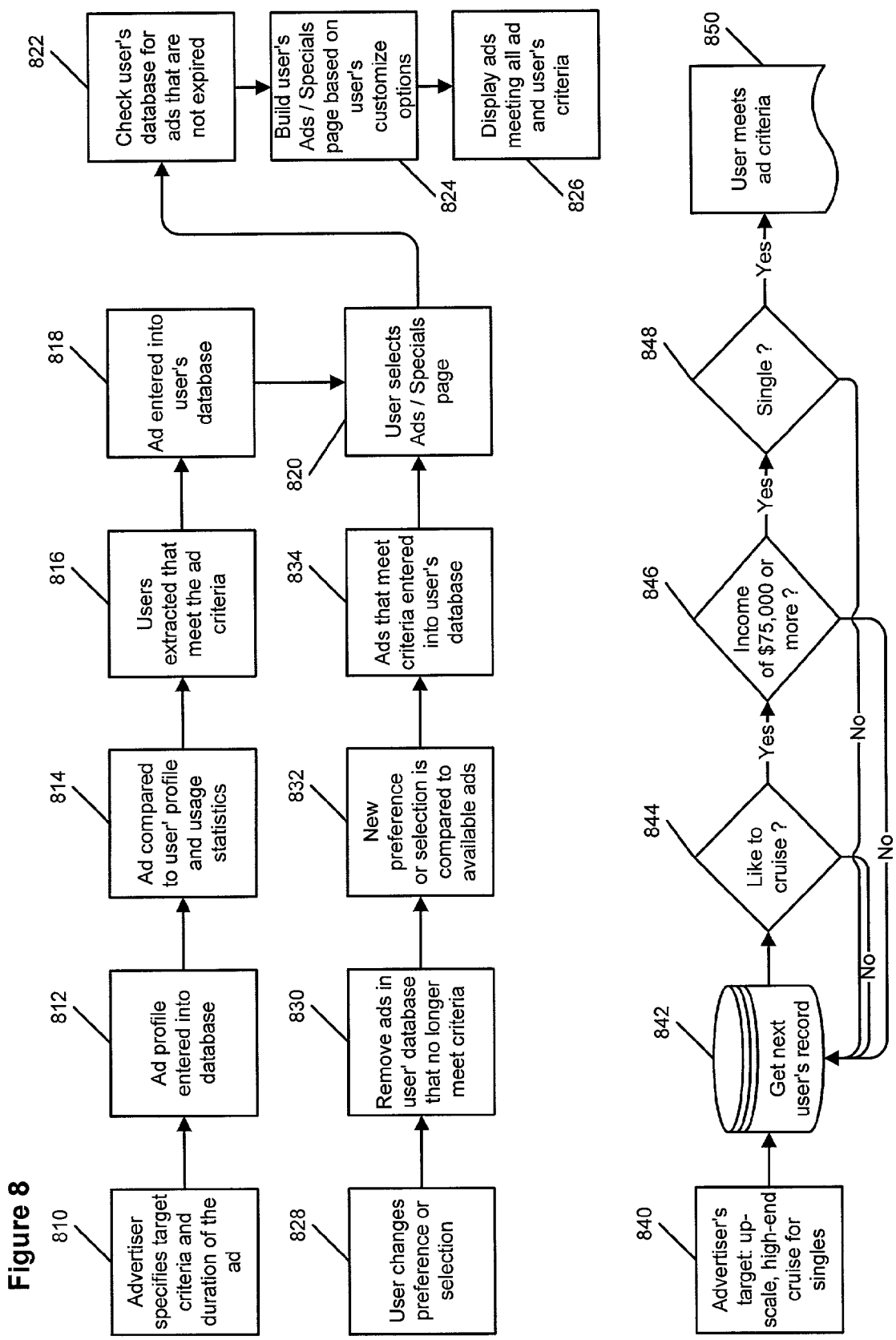

METHOD FOR PROVIDING CUSTOMIZED USER INTERFACE AND TARGETED MARKETING FORUM

FIELD OF THE INVENTION

The present invention relates to providing network services, specifically for facilitating business or commerce using a customized user interface and a network-provided targeted marketing forum.

BACKGROUND STATEMENT

Advertisements play a significant role in e-commerce and the Internet industry in general. The typical commercial web site includes many advertisements, each competing for consumer attention. "Consumer" and "user" are used throughout this specification to refer to anyone who uses the subject computer network, e.g. the Internet. "Advertisement" or "ad" as used herein refers to any information intended to convey to a user an impression of a product, service, or the source thereof. An ad may be any promotional or commercial message. "Advertisers" refers to entities providing advertisement, merchants, service providers, and other commercial entities.

Advertisers use various tactics to attract a user's attention and response. Tactics include large text fonts, and unusual colors, flashing graphics, video and sound clips. Some advertisements include applets, scripts, HTML or the like to cause the presentation of a short program or to present the advertisement in a separate window. Primary forms of advertising on the web are banner ads and pop up ads. Banner and pop-up ads may be static or animated. Some ads utilize streaming video.

Another Internet marketing tool is an opt-in e-mail scheme where marketing materials are e-mailed to the consumer only after the consumer has given permission or requested to receive materials from the sender. The promotions may be from the sender or any entity having entered an agreement with the sender to use the consumer e-mail list. Although the consumer consented to receiving promotions via e-mail, many e-mails are treated as junk mail and deleted without being read. Accordingly, this type of advertising is generally not effective. However, messages from a source of high interest to the consumer stand a better chance of getting read.

Many web site managers use media placement services or on-line ad agencies, which are third parties who place advertisements on the web site. Advertisements presented through web sites utilize a broadcasting marketing model because the advertisements reach a large audience. Such advertisements are often priced on the basis of CPM (cost per thousand) viewers. Under this model, advertisements are only generally targeted by placing the ad on sites likely or known to be frequented by a prescribed population segment, e.g. a certain age group or interest group.

While advertisements presented on the Internet may be exposed to a vast audience, a large percentage of that audience is not interested in the advertisement. Many consumers consider the advertisements as an intrusion in the activity they are engaged in while on the Internet.

What remains needed is a method for delivering information to the consumer through a targeted forum. What is further needed is more efficient method of disseminating advertisements and other information over the Internet to consumers that have indicated a high interest in the subject matter of the ad.

SUMMARY OF THE INVENTION

The present invention provides the consumer with a network interface tailored in appearance and content to the consumer's specifications. In addition, the present invention provides advertisers and other commercial entities with a targeted audience of consumers having an increased likelihood of interest in the advertisement or commercial content. This network interface is designed to cater to consumers' needs and preferences, and not dictated by the agendas of sellers, advertisers, and proprietors. The effect is to provide a forum for buyers and sellers to interact while satisfying the preferences of both parties simultaneously, in contrast with conventional advertising and marketing models.

The customized interface is achieved by generating a computer file or "page" based on information intentionally provided by the user. Information provided by the user comprises a user profile including any preferences for advertising, content or layout of the page. Information about the advertisements comprises an ad profile including a description of the ad and optionally a definition of the targeted audience. The user profiles and ad profiles are compared to determine matches according to a prescribed parameter. The prescribed parameters dictate how to relate information between the two types of profiles, i.e., user profile and ad profile. A match is determined where the ad is consistent with the user's preferences as defined in their respective profiles. The custom page is generated in an appropriate conventional manner including one or more of the matching ads. The page is formatted such that the layout is consistent with the user's preferences defined in the user profile. In a fully customized page, nothing in the page is inconsistent with the user's preferences, i.e., ads that fall outside the prescribed parameter are excluded from the page.

In a further aspect of the present invention, targeted marketing is provided by including a definition of the targeted audience in the ad profile. A match is then determined where the user profile falls within the defined target of the ad and the ad is consistent with the user's preferences defined in the user profile. The effect of the two-way match is a filtration of users, such that the ad is received by the subset of the intended audience who are amenable to receiving the ad.

Another aspect of the invention is that the method allows for a variety of revenue generating schemes. The advertising fee may be a function of the results of the matching described above. For example, the fee may be based on the number of user profiles that match the ad profile, or the number of users that matched the ad profile who also received the ad.

In further aspect, the method maintains statistical data about the users, advertisements, and matches. A user may then obtain statistics of his/her personal network activities, for example, frequency of visiting individual merchant web sites or exercising promotional discounts. Advertises may obtain statistics about individual ads. Furthermore the statistical data may be an additional basis for determining the advertisement fee.

BRIEF DESCRIPTION OF THE DRAWINGS

Other objects, features and advantages of the invention discussed in the above summary of the invention will be more clearly understood from the following detailed description of the preferred embodiments, which are illustrative only, when taken together with the accompanying drawings in which:

FIG. 1 is a flow chart showing an overview of the method of the preferred embodiment of the present invention;

FIG. 8 is a flow chart showing further operations of the preferred embodiment matching users with marketing information of an ad.

DETAILED DESCRIPTION OF THE PREFERRED EMBODIMENT

Figure 1A:
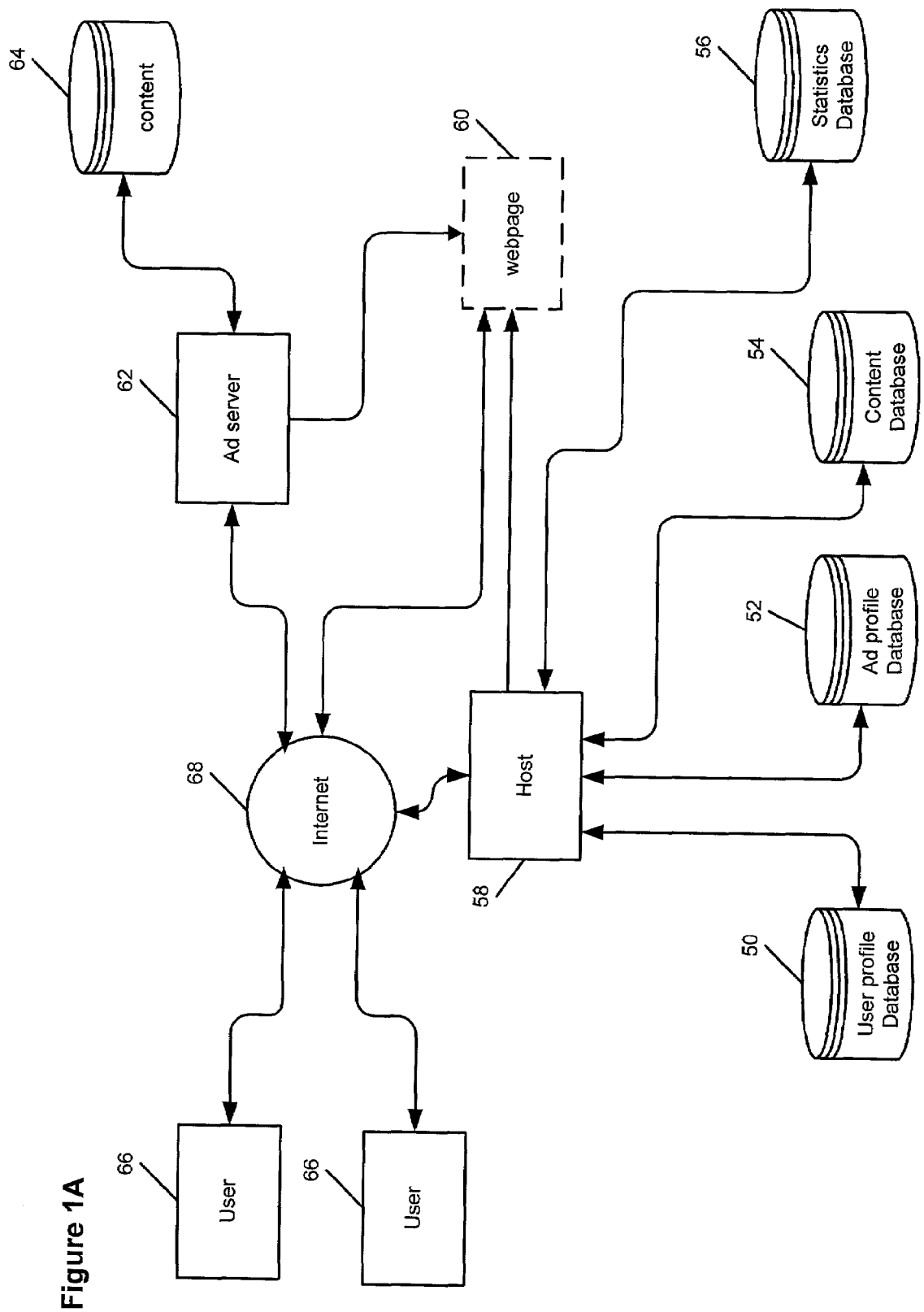
FIG. 1A is a block diagram of the underlying infrastructure for implementing the preferred embodiment.

In the preferred embodiment of the present invention, the method provides users with a customized interface to a computer network, such as the Internet, facilitating an electronic market for products, services, and information, and provides advertisers with an efficient marketing forum. The customized interface and associated services can be offered for free to users with the system financed by revenue received from the advertisers.

Referring to FIG. 1, in the preferred embodiment, the method involves matching users and advertisements such that users receive the types of advertisements they want, where and when they want it and advertisements are sent to receptive users. By way of overview of the method, at step 10, users subscribe to the system or service provider operating a host computer. When a user subscribes, the user provides a variety of information about his/her preferences for the custom pages and the information he/she would like to receive. At step 12, the information about each user is compiled in a user profile and stored in the user profile database. At step 14, advertisers provide advertisements or access to advertisements to be provided to select users. The advertisements or the addresses to access advertisements are stored in a content database. At step 16, for each advertisement, an ad profile is generated with information about the ad and stored in an ad profile database. The ad profile includes information that describes the ad in terms that may be matched with user preferences specified in the user profiles. Optionally the advertiser may include information about the targeted audience for the ad. The order of steps 10-12 and 14-16 is immaterial. At step 18, the profiles are compared to determine matches. Matching may be performed by comparing a plurality of ad profiles to a user profile or a plurality of user profiles to an ad profile. The method employed may depend on the timing when the comparing step is performed. For example, if the comparing is performed each time a user enters or changes data, or performed in response to a user action, the comparison is conducive to a plurality of ad profiles. Conversely, if the comparison is performed when an ad profile is generated or altered, the comparison is conducive to a plurality of user profiles. Optionally, both methods may be employed cooperatively. At step 20, statistical data is optionally compiled and stored in a statistics database. At step 22, indication of the matches may be stored in the user profile database and/or ad profile database. Alternatively, the comparing step is performed contemporaneously with generating a custom web page in which case the matches need not be stored in a database.

When a user accesses the system, a customized web page is presented to the user serving as an interface to the Internet, containing select information, advertisements, and hyperlinks. At step 24, the host receives a user action such as the input of a username and password or other indication that the user wants his/her custom page displayed. At step 26, the host accesses the user profile associated with the user. At step 28, the host generates a custom web page for the user according to the layout and content preferences indicated in the user profile. At step 30, the host incorporates the appropriate matching ads in the custom page. In doing so, the host accommodates any preferences or constraints indicated in the user profile, at step 32. If the matches are not previously stored, the host determines the matches at about this point by comparing the user profile with ad profiles contained in the ad profile database. The selected matching ads are then retrieved from the content database. For example, if the user indicated a preference for discounts on personal electronic devices, the host includes any available information about discounts on personal electronic devices on the user's custom web pages. If the user defined list of favorite merchants, the ads associated with those merchants are selected for inclusion in the web page. To accommodate the user's specifications, after determining what information satisfies the user's preferences, the host determines whether the user specified how that information is to be displayed and accommodates such formatting or layout specifications. For example, if the user indicated weather information and that such information is to be displayed at the bottom right corner of the home page, the host includes such information as specified directly by the user. Optionally, at step 34, statistical data is compiled and stored. At step 36, the custom page is presented to the user. Finally, at step 38, the advertiser is charged a fee according to a prescribed criteria; this charging step is described in more detail below with reference to FIG. 8.

Referring to FIG. 1A, the underlying infrastructure uses the Internet 68 and includes a host computer 58, one or more databases 50-56, the users 66, and optionally advertiser servers 62. The host server 58 performs the various processes including setting up, generating and updating customized web pages, storing and managing the potentially voluminous user and advertiser data, and implementing special features or services. Communication between the host server 58 and users 66 is transmitted through the Internet 68. The data is organized in a plurality of databases including, for example, user profiles 50, ad profiles 52, content 54, and statistics 56. User profiles contain the information provided by the user that indicates the user's preferences about customized Website ranging from substantive to formatting information. The user provides this information by, for example, connecting to the host 58 through the Internet 68 completing and submitting forms. Ad profiles contain information from the advertiser, or system or both, identifying the type of ad that is associated and optionally indicating the advertisers intended targeted audience for the ad. Preferably, the advertiser provides the information for the ad profile. Alternatively, the host may compile such information either automatically or with assistance from personnel. Ads, as used in this context, need not be limited to promotional data. Content database 54 contains substantive data files from advertisers and URL's referencing data files. Content may also be stored and hosted by another server 62, using another database 64. Optionally, as the method is implemented, the host compiles statistics about its users, ads, and advertisers, which may be stored in the statistics database 56. The host strictly controls the use of the statistics information, restricting third parties to access that information.

Figure 1B:
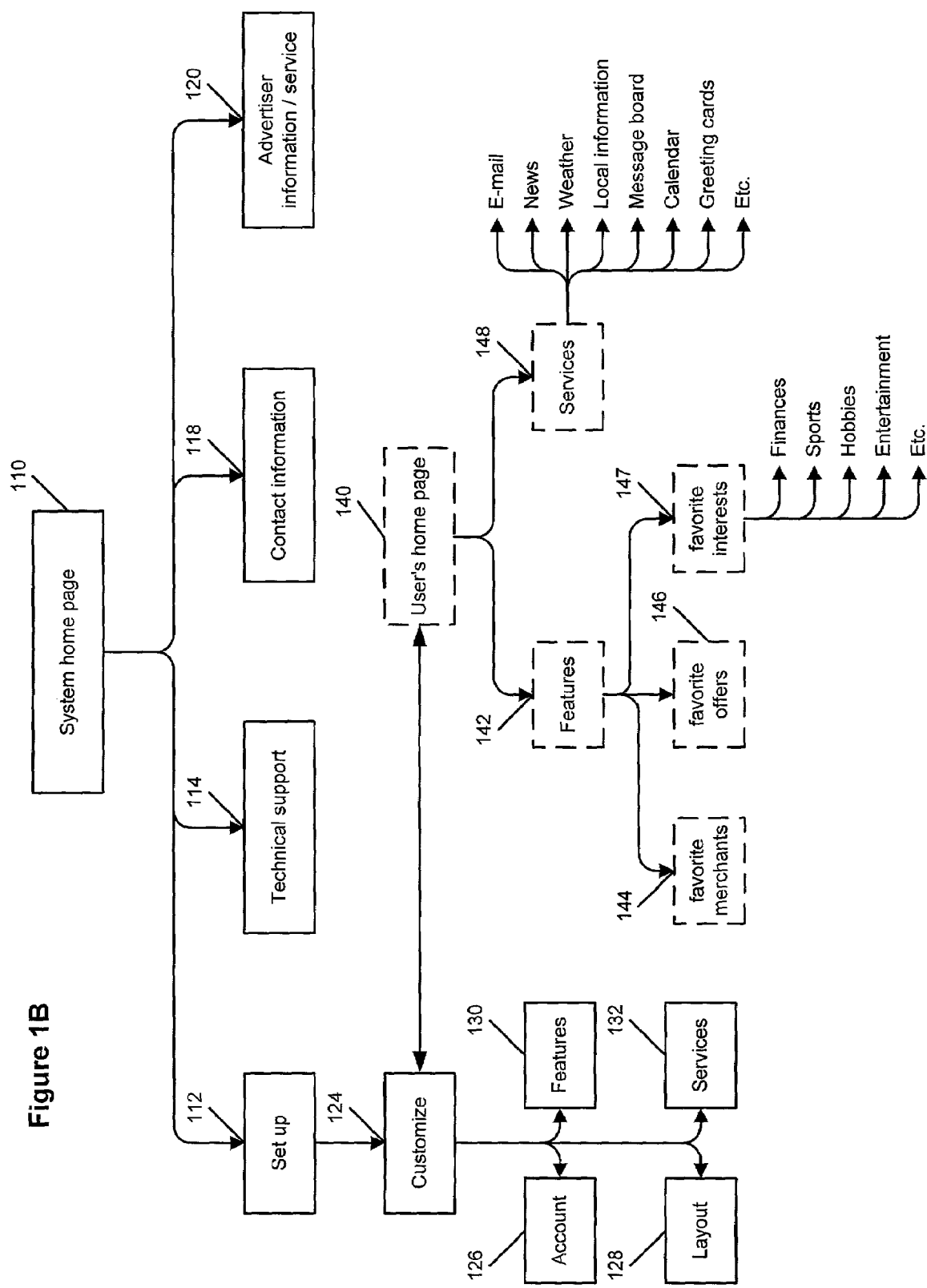
FIG. 1B is a block diagram showing an arrangement of web pages in the preferred embodiment.

In the preferred embodiment a host web site provides users and advertisers with the general services and utilities needed for utilizing the system. Referring to FIG. 1B, from the host web site 110, users may access the set-up page 112, which guides the user in setting up an account and user-profile. From the set-up page, the user may access the customize page 124 where the user may access the various pages that enable the user to set the user preferences regarding substance and format of his/her custom page. An account page 126 is provided to solicit information about the user which typically includes at least a user name and password. The layout page 128 is provided to solicit information about the format of the custom web page. Substantive content for the page may be conceptually divided into (1) content featured on the Internet and (2) services supported by various applications operating on the Internet. The features page 130 is provided to solicit information about the Internet content desired. This page allow users to specify which retailers they are most interested in, as well as what types of promotions and information they want presented on their web page. The user's preferences about content may be defined in a variety of ways, for example, according to product, service, brand name, type of merchant, or information topic. The user may employ a combination of these ways, i.e., listing favorites in more than one category. The users' specifications about the features effect which ads are eventually presented on the custom generated web pages. The services page 132 is provided to solicit information about the services or application programs the user desires. Services include for example, e-mail, local specific information, messaging, and other Internet program. On each of these four pages, the user is further guides to provide the information about the user's preferences that the host compiles in a user profile and uses to generate the customized web pages for the user.

Typically the customized interface is not a single web page, but a web site having a collection of web pages with one page designated as the home page. The users' customized web pages are typically generated dynamically in real time (hence depicted in phantom) and may be organized as follows: For example, a custom web site may include a user home page 140, a features page 142, and services page 148. Pages accessible from the features page may include the favorite merchants page 144, favorite offers page 146, and favorite interests page 147. For example, elected merchants 144 may be a selection of well known retailers; special offers 146 may be discounts at particular retailers or on certain services; and favorite interest 147 may be scores for select spectator sports, stock prices, advance notice of traveling shows and special programs at the public library. The information on the features page may be particularly specified by the user or favorite by the host based on the data in the user's profile, or based on some combination thereof. From the services page, various services may be launched, for example, e-mail, news, weather, local information, message board, calendar, and greeting cards. Alternatively, some or all of the features and services may be accessible directly from the home page.

Every time the user accesses his or her customized web site, it is generated in real-time according to the most current information in the various system databases, including the user's preferences and the information in the other databases satisfying any of the user's preferences.

Figure 2:
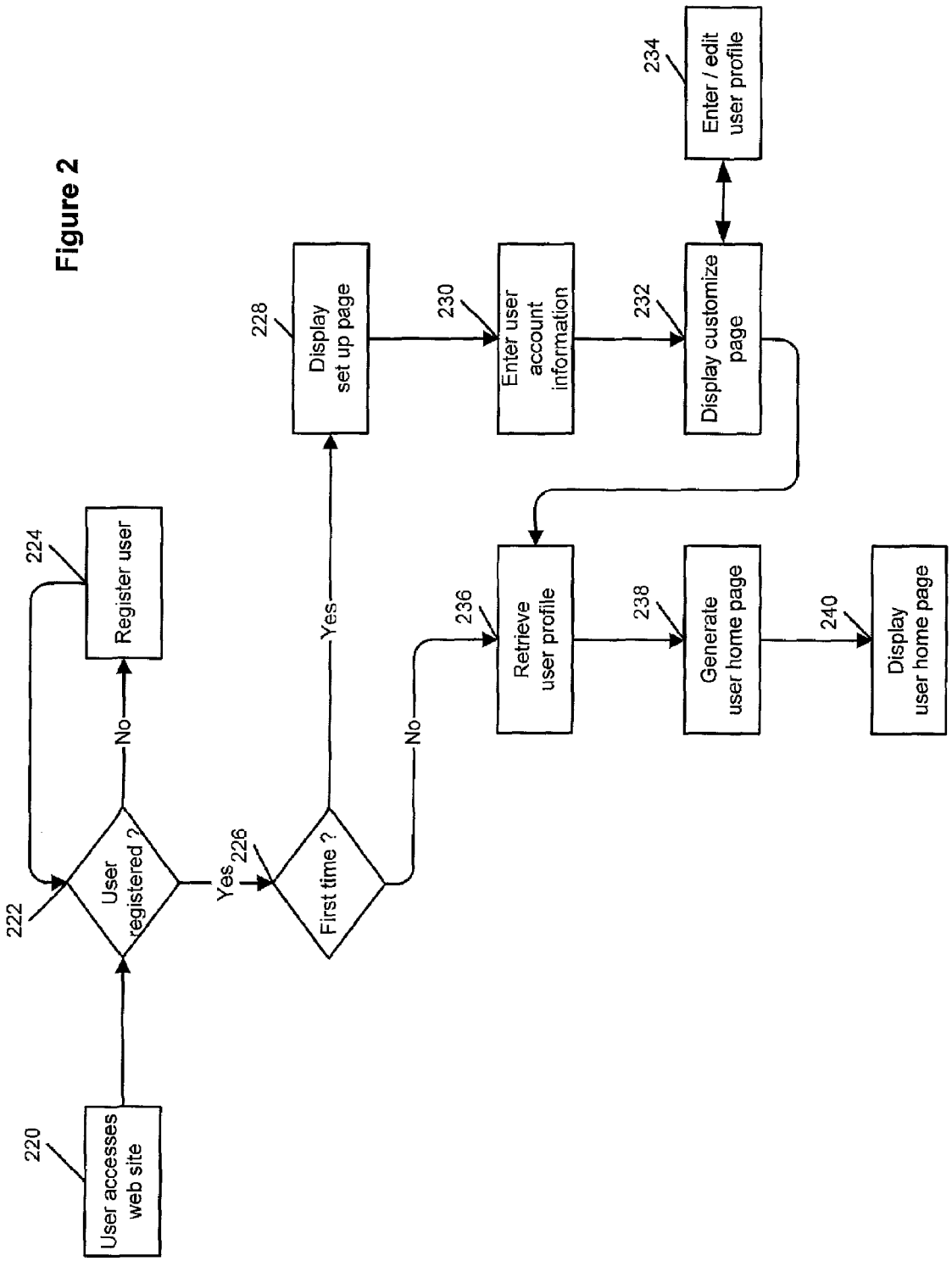
FIG. 2 is a flow chart showing initiation process of the preferred embodiment.

More specifically, the method of the preferred embodiment is outlined with reference to FIGS. 2-8. Referring to FIG. 2, initially the user registers or subscribes with the service provider to establish an identity, e.g., an account, and enters his/her preferences regarding page layout, page content, and the various available services. At step 220, the user accesses the system web site using conventional means of Internet access. At step 222, the system determines whether the user is registered. If the user is not registered, at step 224 the system interfaces with the user to register the user. Registration involves establishing a username and password by which to identify the user. If the user is registered, at step 226, the system determines whether this instance is the first time the user is accessing the web site, in other words whether the user has previously set up an account. If this is the user's first time, at step 228 the system displays a set-up-page to facilitate setting up an account and customized web site. At step 230 the user enters account information that includes, for example, username, password, and zip code. At step 232 the system displays the customize page from which the user may enter or edit any information about itself or its preferences. The customize page may organize the way information is received from the user. The information may be categorized as, for example: account, layout, features, and services. For each category, the host may provide additional web pages with forms or other input receiving techniques to assist the user in entering his/her preferences and other information. The user may enter or change his/her information at any time, at step 234. The information from the user is compiled in a user profile and stored in a database. Upon completion of entering or editing the users information, the host prepares to display the custom home page for the user. At step 236, the host retrieves the user's profile. At step 238, the host formulates or generates the user's custom home page according to the user's profile, and at step 240, the host displays the customized user home page. The user's custom home page is generated in real-time using dynamic publishing techniques, described below.

Figure 3:
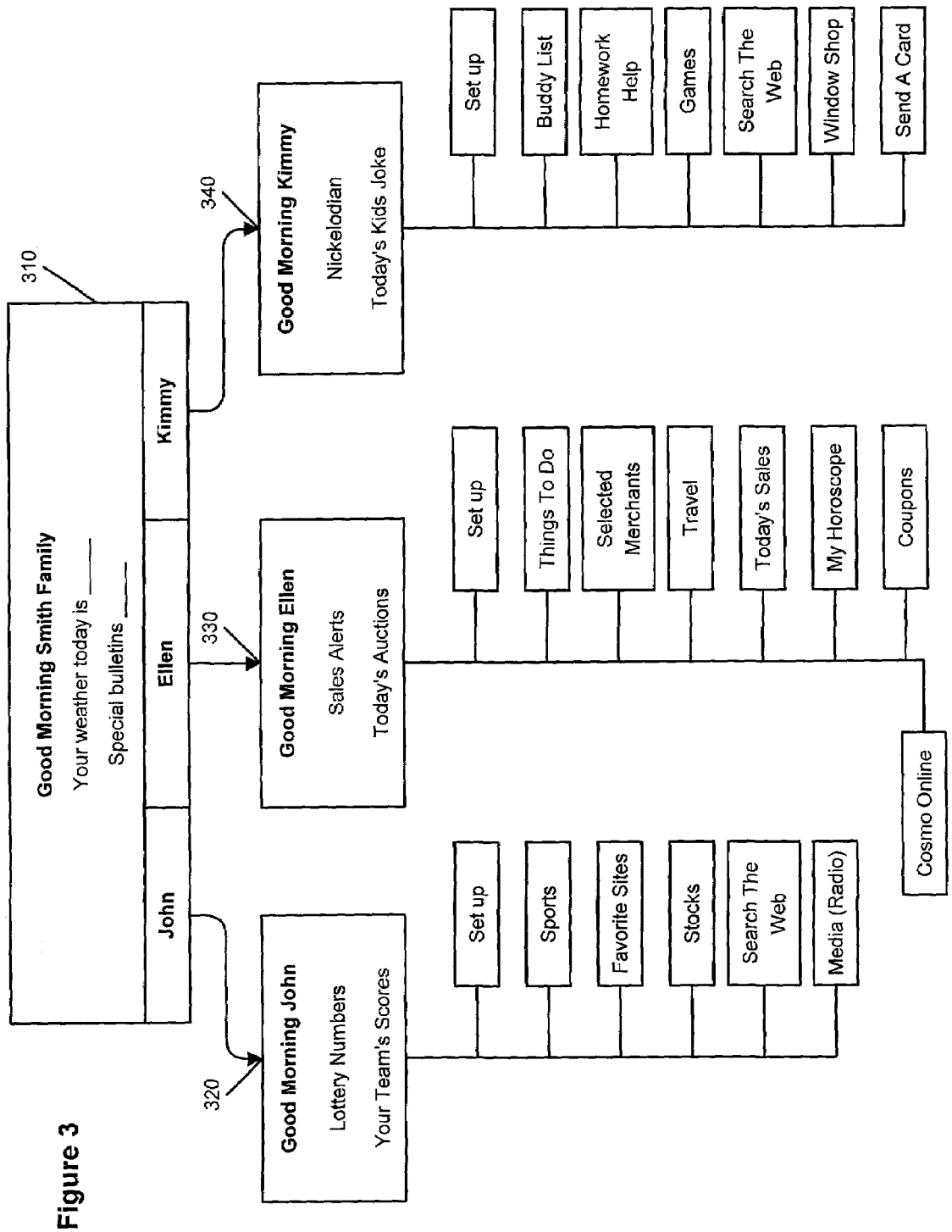
FIG. 3 is a block diagram showing an arrangement of web pages in another embodiment.

A number of custom web sites may be grouped where the users have an association. For example, a family of three users may be grouped such that the three user web sites share a common home page. Users may be individual or grouped into a family, which may or may not reflect genuine familial ties. Referring to FIG. 3, a custom home page for a family 310 may contain some information (including features and services) that reflects interest common to all the family members, e.g. weather and special bulletins services. In addition the family custom home page contains links to individual user's custom home pages 320, 330, and 340, each one containing information reflecting the interests of the individual. The information for the family is maintained the same way as it is maintained for an individual. If the user chooses to edit its account information, the host displays the account page 126. From the account page, the user may update its own account or the family account. If the user chooses to edit the family data, the current family data is displayed in a format where the user may change the information and the system receives and stores the new information in the users database. If the user chooses to edit its individual data, the system displays the current data whereby the user may update the data. The system receives and stores the updated data. The data may be utilized to further customize the user's experience browsing the network. The other categories of information may be updated similarly.

Figure 4:
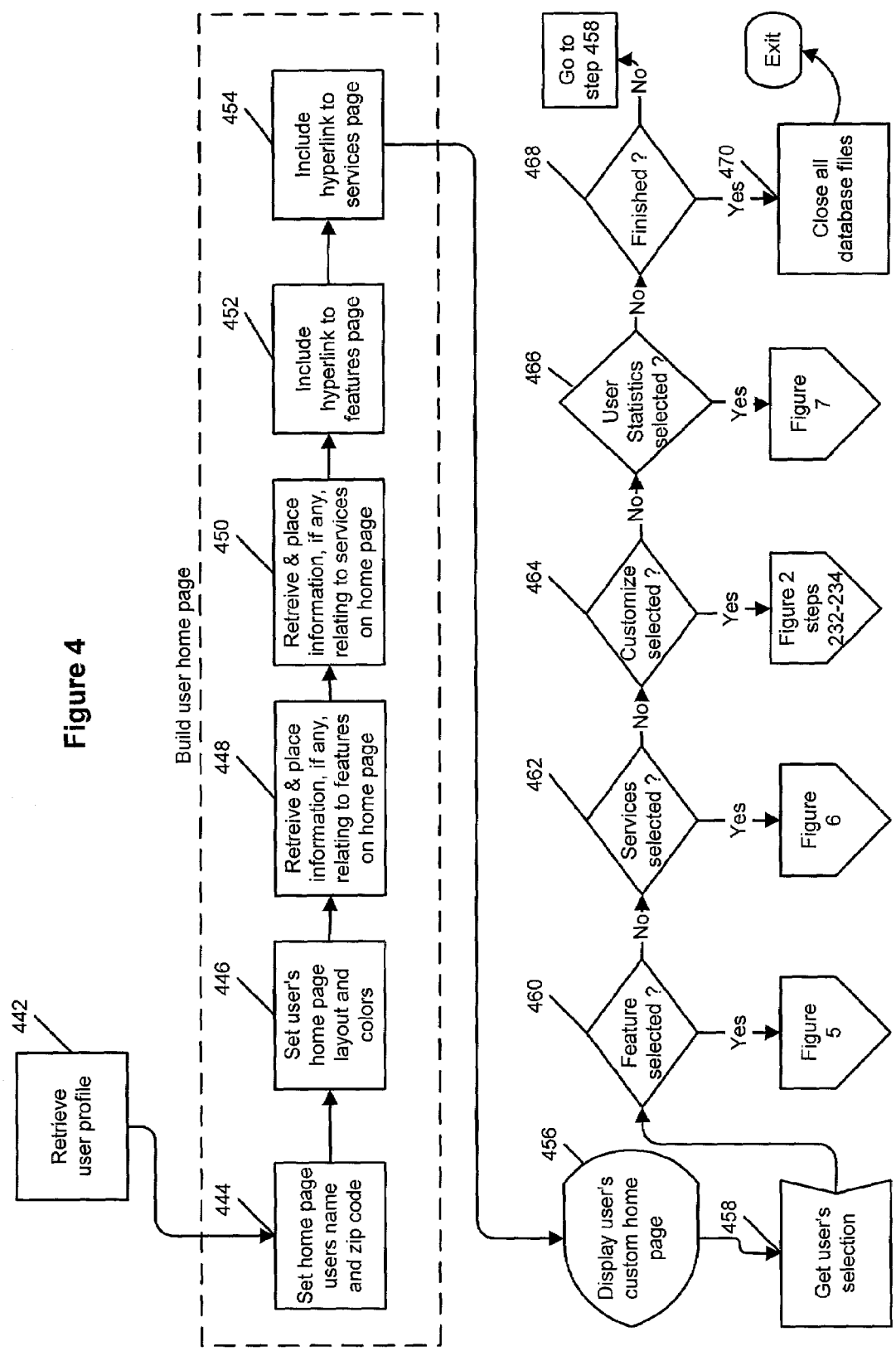
FIG. 4 is a flow chart showing operations of the preferred embodiment involving generating the user's home page.

Referring to FIG. 4, when a user seeks to access his/her custom web site, the host generates the customized home page in real time and stands by for further indications from the user. To generate the home page, at step 442, the host retrieves the user's profile, including the user's zip code (to facilitate providing local information), layout preferences, features information, and any other pertinent information. Transparent to the user, the host preferably uses a web page template or the like to start a custom web page adding or adjusting it according to the user's preferences previously indicated in the user profile. At step 444, the host sets up the home page based on the username and zip code. At step 446, the host sets the user's layout preferences with respect to feature, characteristics and content, e.g. color, icon placement, maximum number of choices presented. If the user profile specifies a selection of features to be displayed on the custom home page, at step 448, the host retrieves the appropriate information including ads and hyperlinks and places the information on the home page in accordance with the layout preferences. If the user profile specifies a selection of services to be accessible from the home page, at step 450, the host retrieves the appropriate information, applications, and hyperlinks, and places them on the page. If the user profile specifies a selection of features to be provided on a separate web page, at step 452, the host includes a link to a custom feature page on the custom home page. If the user profile specifies a selection of services to be provided on a separate page, at step 454, the host includes ta link to the custom services page on the custom home page. The user may specify any combination of these options. Any other information or hyperlinks to be placed on the home page according to the user profile are retrieved and placed, such as links to customize and statistics pages. The resulting generated custom home page may include substantive information as well as icons or the like with hyperlinks to other web pages such as other dynamically generated web pages, other system web pages, or web pages maintained by other entities e.g. merchants, advertisers. At step 456, the host presents the newly generated custom home page. The user may access the other custom pages as well as advertiser's web sites from the custom home page by selecting the hyperlinks. At step 458, the host receives the user's selection. At step 460, if the user selects features, the host generates and displays the user's features page where the user is presented with the feature information that matches the user's preferences. At step 462, if the user selects services, the host generates and displays the user's services page where the user may access and use the services as specified in the user profile. In generating the custom features page or services page, the host may reference the ad profile database and/or the content database to obtain the content and hyperlinks needed to place on the custom page. The host may perform comparisons of the ad profile with the user profile at this step to determine matches or to supplement previously determined matches. At step 464, if the user selects to further customize, the host displays the customize page where the user may further edit or update its data, including preferences and selections. At step 466, if the user selects statistics, the host presents the user's statistics page that provides information about the user's past activities. At step 468 if the user is finished with network activities, at step 470 the host closes the database files and exits the user.

The custom web pages may be generated using dynamic publishing. The web page is generated only on demand, i.e., at the time a user wants to receive that page, and is not stored (or it is stored only for a short time) when the user leaves that page. The web page is generated by the combination of static and dynamic portions. The static portion is a template or framework for the web page having space holders and typically includes a header and footer. The dynamic portion is the substance of the web page that is filled into the space holders. For example, a template may have space holders at the top of the page to be populated with the user's username and the title of the page, a space holder for certain icons and hyperlinks, and a space holder in the center for the most current information satisfying some criteria. Dynamic publishing preferably uses sophisticated database management systems and implements push-pull technology. Push-pull technology is where information is "pushed" into dynamic databases as the information is received by the system and organized according to associated criteria and where information is "pulled" from those databases as needed to provide the substantive content for the web pages.

Figure 5:
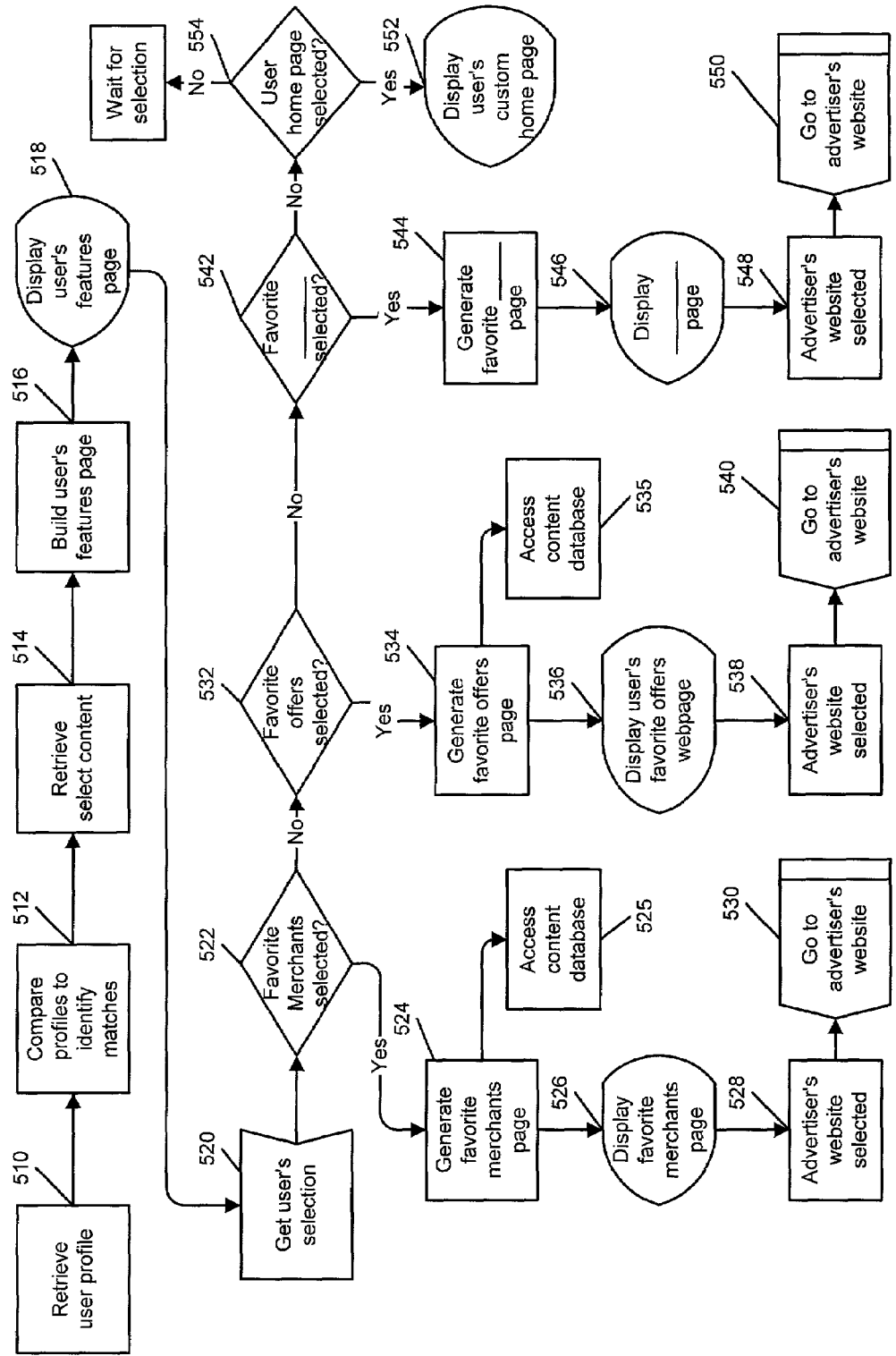
FIG. 5 is a flow chart showing further operations of the preferred embodiment for providing favorite merchants or offers or other features that can be included in a particular user's web page.

Referring to FIG. 5, from the user's custom home page, the user may select to explore the features page. At steps 500 and 510, the host retrieves the necessary information including user's profile and ad profiles. At step 512, the host compares the retrieved profiles to identify any matches. For example, the user profile may indicate a preference for separate pages for favorite merchants and favorite offers. Furthermore, the user profile may indicate its favorite merchants by name, and that its favorite offers relate to children's clothing and home health care products. The ad profile includes the name of the merchant providing the ad, and the type of product featured in the ad. The host then scans the ad database to find ads related to the named merchants, children's clothing, or home health care products. The host includes parameters that help match the information in the user profiles to the ad profiles. For example, where the ad profile indicates that the ad features clothing of all sizes and types, the host determines that children's clothing falls within the parameters of all clothing and therefore the ad matches the user profile. At step 514, the host retrieves ad content associated with the identified matches. At step 516, the host builds the user's features page using the retrieved ad content and, at step 518, displays the user's custom feature page. The user's custom feature page may have been generated at the same time as the home page, as described above or in response to the user's selection (e.g. click on the appropriate hyperlink on its home page). The searching profiles and determination of matches may be performed at various times including before building the features page, or after the appropriate sub-page is referenced. The custom features page may include substantive information and/or hyperlinks to associated web sites. When the user clicks on a link, at step 520 the host receives the user selection.

For example, at step 522, if the user selects to receive information about the user's favorite merchants, then at step 524 the host generates and displays the user's favorite merchants page. The host may use a previously designed merchant page template in generating the custom page. Should the host require additional information, at step 525, the host retrieves the pertinent information from the content database to include the most current information in the web page. The resulting page typically contains hyperlinks to the appropriate merchant's web sites. At step 526, the user may follow any of the hyperlinks to a merchant's web site (steps 528-530). The user may easily return to its merchant page or any other custom web page.

At step 532, if the user selects favorite offers at steps 534 and 536, the host generates and displays the user's favorite offers page. This page contains the substance of the advertisements, discounts, current specials, sales, or present some information along with hyperlinks to the advertisers' web sites, or some combination thereof. The advertisements and other promotions are organized and formatted according to the user's layout preferences. At step 535, the host may reference one or more databases for advertisements, promotions, and other information satisfying the user's preferences. The host may also reference the user's profile to check the user's layout preferences to determine how much information to present and in what format. In addition to or instead of the substantive information about the special offer and coupons, the favorite offers page preferably continue hyperlinks or processes that respond to user selections made at step 538, and display the associated web page at step 540.

Steps 542-550 illustrate that between the host and the user preference there may be other specialized pages for the user to select. At anytime if the user selects to return to its custom home page, at steps 550-552 the host displays the home page, otherwise waits for user input at step 554.

To maximize customization, the user may specify layout and formatting instructions or constraints for all or part of the custom web pages. For example, layout information may include selection of colors, pictures, and relative placement. The user may specify how its web site is to be organized, within the framework provided by the system. The user may specify preferences for advertising formats, for example, banner ads, infomercials, print, animated, etc. The user may specify the amount of advertising in any given category of products and services to be presented simultaneously. The system may have a default setting, for example to limit advertisements to maximum of six presented on the same screen at one time. The setting may also include a limitation on space, i.e., percentage of screen, available for advertisements and promotions.

General content, including advertisements, is customized according to the user preferences with respect to features. Features information may include, for example, selections of merchants, special offers, and advertisements. The host maintains, in its ad profile database 52, a current comprehensive list of merchants doing business over the network. The user may select individual merchants from the list, including particular retailers, manufactures, or brand names. In addition the user may select categories or type of merchandise, e.g. children's clothing, personal appliances, music, auto, or department stores, boutiques, discount, etc. The user may select from an array of choices with regards to the types of special offers and advertisements the user is interested in receiving. The communications from the desired merchants and vendors may include, for example, announcements about the arrival of new products or services; advance notice of sales; special offers, sales or discounts; gift certificates for reduction of price; coupons for merchandise; and introductory offers for new customers. The selection of merchants is used, for example, in generating the merchants section or web page of the user's customized web site, which may be viewed as a virtual mall in the sense that all the favorite merchants are accessible from one location.

Applications or other content are customized according to the user preferences with respect to services. Services, for example, may include notification accessible from their custom web page about a selection of topics. The topics may be general or specific; local, national, global, or targeted to a specific geographic area; commercial or non-commercial, etc. Specific examples, include local weather, weather in some vacation spot, American baseball, updates on the Olympics, news about an individual athlete or public figure, sales at local supermarkets, movies playing at local theaters, news on the national elections, and other areas of interest susceptible to frequent (e.g. daily, weekly) updates. Thereafter, every time the user accesses its web site, the host compiles all information satisfying any of the user's selections and makes this information available to the user in the chosen format, also specified by the user. The host maintains the user's choices. Another service offered is e-mail notification. For example, the user may select whether to receive notices about products, services, or news, matching its select preferences via e-mail. The system may offer conventional e-mail services along with chat and message board services; all of which are web-based.

Figure 6:
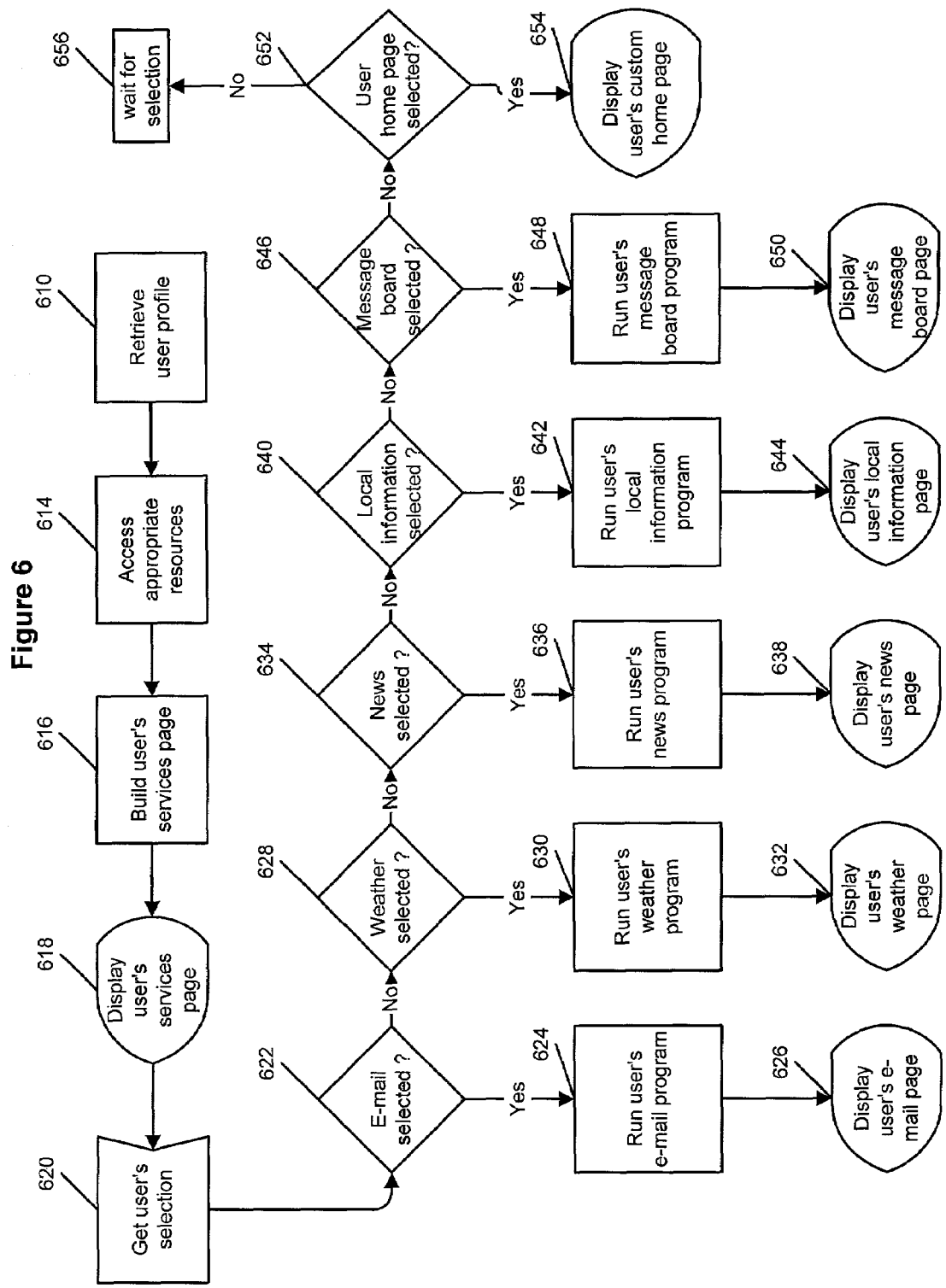
FIG. 6 is a flow chart showing further operations of the preferred embodiment for providing e-mail, weather, or other services that can be included in the user's web page.

To generate the services page, the host references the programs or applications associated with the services specified in the user profile. Referring to FIG. 6, from the user's custom home page, the user can explore available services. At step 610, the host retrieves the user's profile. After accessing the appropriate resources at step 614, at steps 616 and 618, the host generates and displays the custom services page. The host receives the user's selection of a service at step 620. If the user selects e-mail, at steps 622-626, the host proceeds with the e-mail processes; running the e-mail program and displaying a web page from which the user accesses his or her e-mail. If the user selects weather, the host proceeds with steps 628-632, running the weather program and displaying the weather page. The weather page contains weather information as specified by the user, e.g. for a particular location. If the user selects news, the host proceeds with steps 634-638 running the news program and displaying the news page. The news page displayed is determined by the user's previously indicated preferences, e.g. news related to a specific topic, such as sports, national elections, developments in a designated country, etc. If the user selects local information, at steps 640-644, the host proceeds to run the local information program and display the user's local information. The type and format of local information displayed is determined by the user specifications. Examples of local information include public transportation, movies, traffic, museums, restaurants, and holidays. Typically the zip code is used to determine the user's location, proceeds to select information about movies playing at movie theaters nearest the user's location and thereby displays the local movie listing. If the user selects message board, the host proceeds with steps 646-650, running the message board program and displaying the user's message board page. At anytime the user may select to return to his or her home page at step 552 and step 554 the host display the home page. Otherwise the host waits for the user selection at step 556. The user may also return to his or her home page at anytime by indicating so, e.g., typing in URL or clicking on icon. Many services may be implemented by an icon on the user's home page, if preferred by the user.

Optionally the host may provide a personal calendar as part of the services available to the user. In this service, the users indicate various dates with significance or occasions. Then when customizing, the host may remind the user of those dates. Furthermore, the host may select advertisements and promotions most suitable for the next upcoming occasion noted on the user's personal calendar and present them as the date approaches.

Statistical data recorded as the users use the custom web sites, is useful for customization and for determining advertising prices. Statistics include any objective information, such as, the number of times a user referenced his or her favorite merchants page, the dollar amount of purchases made by a user, the number of times a particular ad was viewed, and other data concerning the actions and inactions of the user while interacting with the custom web site. Having accumulated usage data with respect to users as well as advertisements, the data may be used to supplement the process of selecting ads to place on the custom web pages. For example, if a user limited ad space to half the display and a plurality of ads qualify for placement based on the matching scheme, the host may use the statistical data to select ads from those qualifying. The host may select ads based on popularity, unpopularity, quality of the advertiser, or information about the user other than its preferences such as past purchases.

Figure 7:
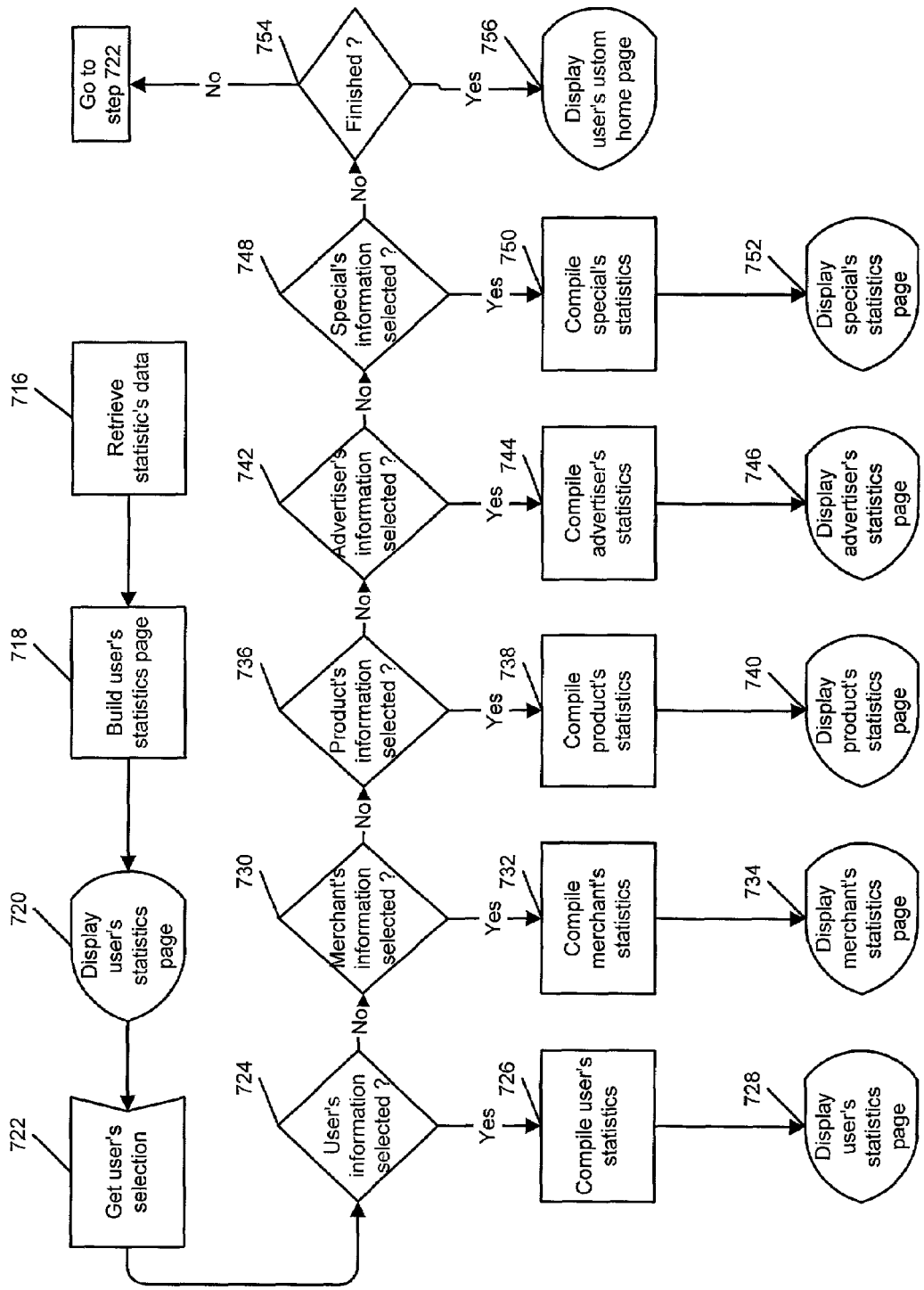
FIG. 7 is a flow chart showing further operations of the preferred embodiment involving the statistics generated through use of the method.

The statistical data relating to a user may be is made available to that user. Referring to FIG. 7, at step 716, the host retrieves from the statistics database the data necessary to compile the statistical information. At step 718, the host generates the user's statistics page and at step 720 the host displays the page including a menu of categories of statistics available. At step 722 the host receives the user's selection of category of statistics. The categories may include for example, information about the user, merchants, products, advertisers, and specials. For each category selected the host complies the information accordingly and generates and displays a web page showing the corresponding statistical data, reflected by steps 742-752. When the user is finished, at step 754, the user is returned to the custom home page at step 756. Depending on the agreement made with the advertiser and/or users, the statistics about the users and about the advertisers and ads may be secured allowing limited access and limited use after disclosure. The statistics preferably comprise one basis for generating revenue, as discussed below.

In addition to customization of the user interface, in the preferred embodiment advertisers (including merchants and other commercial entities) are provided with a targeted marketing forum. The advertisers must be registered or otherwise establish an affiliation with the host. Typically the affiliation is a contractual business relationship. The advertisers provide the host with content and/or an advertisement for the host to present to an appropriate selection of users, taking into account the user's and the advertiser's interests. Upon providing the host with an ad or other content, an ad profile or other identification is generated (by the advertiser or the host) and stored in one or more databases. To describe the targeted audience the ad profile may, for example, include gender, age range, geographic location, income level, or family type. The ad profile may also include user preferences or interest as part of the description of the targeted audience. For example, the ad may target people with interest in cars or stocks or worms or tap dancing or genetic engineering or any other topic, activity, product, or the like.

Receiving advertisement or other content and establishing affiliations with advertisers is typically an ongoing process. The host organizes the received information such that the host may retrieve selection information provided by the user to govern the customized web page creation. To generate a customized web page, the host compares the advertisement and other information available with previously defined user selections and preferences. Where the user satisfies the ad criteria and the ad satisfies the user's preferences, a match is determined. This process is called filtration.

The advertising filtration host allows for the cumulative effect of adding "qualifying filters" that limit the demographics and preferences and behaviors of the users to just those consumers that the advertiser wants to reach. The host can narrow down the targeting of consumers by adding the appropriate filters to include or exclude the specific qualifying or disqualifying variables provided by the advertisers or offer professional marketing consulting services to the associated advertisers to assist them in targeting their messages to the most appropriate and likely prospects.

In the preferred embodiment, dynamic databases are used to maintain all the data involved. The databases may be multidimensional and each database may essentially be multiple databases. The databases may contain many different types of records. Database management hosts such as Sequel and Access may be used. The databases are cross-referenced so that changes in any record in any database causes the update of records that are affected by the value of the first record. All records and database may contain various time references to assure that the databases are continuously current. Time references may be, for example, expiration time and date or last modified time and date.

Referring to FIG. 8, the host processes advertisements (ads) as they are received from advertisers, such that the ads are prepared to be incorporated into the appropriate users' custom web pages when called for. At step 810, the advertiser provides an ad and specifies the target criteria and duration of the ad. At step 812, an ad profile is generated and stored in the ad database. Any content, such as the ad itself, may be stored in the content database. At step 814, the ad profile is compared to select entries of the user profiles. At step 816, the users that satisfy the ad criteria are extracted or noted. At step 818, the ad may be indicated in the user profile for those users who satisfy the criteria. Subsequently, at step 820 when a user selects a feature that includes ads, e.g. the special offers feature, then at step 822 the host references the ad profile database for ads that are not expired. At step 824 the host references the user's profile to determine whether to include the ad in the custom web page. At step 826 the ads satisfying both the user's preferences and the advertiser's criteria are displayed on the custom web page.

Ongoing monitoring is performed to maintain accurate records for the users and the ads. When a user changes its user preferences, the host reviews the ads and the user profile to determine whether there is any change in the matches. At step 828, the user changes one or more preferences, selections, or other user information. At step 830 the host removes any ad identified in the user's profile whose criteria is no longer satisfied after the change in user information. At step 832, the user information is compared to the available ads in the advertisers database to determine whether criteria of any additional ads are satisfied due to the change in user information. At step 834, any ads for which the criteria is satisfied, is entered into the user's database. Subsequently when the user selects the ads or specials page, since the databases are current, the host may proceed to preparing the web page.

The criteria provided by the advertiser forms the basis for comparison between users and the ad for the purpose of targeted marketing. Thus meeting the criteria indicates that the advertiser wants to convey the ad to the user and the user wants to receive the ad. For example, at step 840, an advertiser specifies that the target for the accompanying ad consists of up-scale, singles, interested in high-end cruises. At step 842 the host references a user record. At step 844 the host determines whether the user likes to cruise based on the information in the user record. If the determination is affirmative, at step 846 the host determines whether the user is up-scale defined as income of $75,000 or more. If the determination is affirmative, at step 848 the host determines whether the user is single. If the determination is affirmative, at step 850 the host indicates that the user meets the criteria of the ad. If at any of steps 844, 846, or 848, the host determines that the user does not meet the condition, the host references another user record at step 842.

The advertisers finance the system of offering user customization and targeting marketing. Many Internet businesses rely on substantial revenue from the advertisers who want their ads presented on certain web sites. The advertisers select which sites to advertise on based on typical user that visits the site and the popularity of the site. The advertising rates charged to the advertiser typically vary according to these same factors (i.e., audience type and size). A typical fee structure is a circulation fee equal to the cost per unit number of viewers, e.g., cost per thousand. Alternatively, the rate is based on the traffic driven sales. The merchant pays a fee or commission for each sale or transaction made to the user who was driven to the merchant site through the custom web site host.

In the preferred embodiment there is a variety of advertising rate schemes that may be employed to generate revenue to support the customized services. Rates may be determined by the amount of filtration employed; the more narrow the target the higher the rate. Since the filtration process ensures an audience significantly more specialized than the conventional method, advertisers are willing to pay a higher rate than conventional rates. The advertiser is charged for the number of users match the ad criteria the number of matching users who actually receive the advertisements. The accumulated statistical data may vary the advertising rates.

The advertising rates may be based on the available space on the user web sites. Space dedicated to advertisements or certain types of promotions may be determined by the host alone or in conjunction with consumer preferences. The variable rates may be based, for example, on peak vs. off-peak time or geographic origin of consumer.

Advertising rates may also be based on the statistical data about users and advertisers using the system. Statistical data may be obtained at various points in processing. Statistics may be obtained during select user actions, and input or change in user profiles and ad profiles. For example, the host may track the number of times certain custom pages are accessed, the amount of time users spend on any given page, the most popular types of ads specified as favorites, or the most frequented ad pages. Based on the accumulated statistics, the reports may be generated about customer behavior and trends as well as advertisers and advertisement. These reports may be carefully designed to preserve user anonymity.

Effectively the method of the preferred embodiment provides a customizable, simple, and organized network interface and advertising filtration that is dictated and controlled by the consumer. The resulting customized interface reflects the consumer's personal needs and wants with respect to products, services, and information. The customized interface provides the consumer with information, offers, and deals from advertisers that the consumer indicated an interest in. The host provides advertisers with and ability to communicate with those consumers who indicated willingness to receive information from the particular advertiser or information relevant to the consumer personally. The host does not permit unsolicited or unauthorized information to be presented on the customized web pages. Therefore the host reduces waste of time and money spent on disinterested or unqualified consumers.

The network interface is customized according to the consumer's preferences. In tailoring their interface, the consumer may select which features and services are to be incorporated into the consumer's customized interface. The host generates a custom interface by including advertisements and/or other information that is related to interests and preferences previously specified by the consumer in the data they input. The consumer may also specify the types and forms of advertisements the consumer is interested in receiving. The interface generated may contain hyperlinks to unaffiliated web sites where the hyperlinks are organized in a manner most suitable for the consumer. Effectively, the custom interface may be used as a portal to the network, e.g. Internet using the World Wide Web; facilitating the consumer's navigation of the otherwise overwhelming vast volume web sites available on the Internet. By providing information about opportunities, e.g. discounts, offered by companies or organizations selected by the consumer, the consumer is receptive to the promotion and hence the promotion is more effective than, for example, broadcasting the same promotions to a large but mostly uninterested audience.

The host of the present invention provides advertisers access to numerous consumers as well as access to select consumers particularly interested in the advertisers product or services. Based on the consumer's personal data, the host can determine which advertisements, offers, information etc. are most suitable for the consumer and present the selected information on the customer's interface. Furthermore the advertiser may specify a profile consumer as the targeted audience and the host in turn provides the information to consumers who demonstrated interest and match the profile. In this way the host connects potential buyers with sellers through a mutually agreed format. This precisely targeted marketing is very economical and efficient for both parties.

The preferred embodiment provides a means for collection and management of information about consumers, advertisers, and World Wide Web. In exchange for a customized interface with the network, consumers are willing to provide personal information to the host to facilitate the customization. The personal information includes interests, hobbies, and preferences, etc. No personally identifying or other sensitive information is needed to effectively provide the customization. This way consumers may maintain anonymity, thereby achieving a high level of privacy and confidentially. Consumers are assured that the personal information that they do provide will be secured and protected from unauthorized use as well as never be divulged to any third party. Upon collection of personal data from many customers, the host is an attractive resource for advertisers, and sellers, etc. The data collected forms the basis for matching advertisements, and other information to the consumers that are most likely interested in the information. Advertisers have a means for conveying their information to a receptive audience and consumers have the convenience of getting information they want while avoiding unwanted promotions.

Consumers are protected from unwanted promotions, because the host controls all information transmitted to consumers through the host provided interface. The host controls the amount, nature, and presentation of promotions directed to individual consumers through the host. The host and/or the consumers may limit the area where promotions are presented and the format of presentation. Similarly, information received by the host from users is maintained confidentially, i.e. not shared with any third party. The host obtains information from users directly, as users enter their preferences and other data, and indirectly while processing the users' network activities.

The user's privacy is protected in part by the ability to remain anonymous. While the host must have some way of identifying the user, the user need not provide any personally identifying or other sensitive data about their identity. In this way the host is able to provide a variety of customized services to the user, who may essentially remain anonymous. The ability to remain anonymous may relieve any hesitation a user may have in providing information about their personal preferences and habits over an unsecured computer network. For example, full name, home address, home phone number, social security number, employer, business address, and phone number need not be solicited from the user. The user may select any qualifying username (e.g. a pseudonym) and password to serve as a basis for identifying itself.

Privacy and confidentiality is also provided by the closed nature of the system. The customized web sites are not accessible without the appropriate permission, typically a password. Furthermore the data collected about the users remains confidential. Rather than provide user information to an advertiser, the advertiser provides the promotion to the system, which in turn provides the promotion to the user where and when appropriate. The user receives the promotion without giving the advertiser the ability to send unsolicited promotions to the user.

In addition, the users may be provided with a specialized browser with which to access the network. The browser provided by the system incorporates features that enhance the experience of the user and enable the user to take advantage of a greater range of customized services. One feature is that the user may set up direct links to any of its custom web pages. Another feature is an automatic payment useable for any transaction. With the specialized browser, the system may provide a mechanism for activating electronic payment to a third party for products or services, charging the payment to the user's credit card account. The auto payment feature is implemented by establishing a credit card with an affiliated financial institution and opening a financial account with the system linking the credit card. An icon may remain in view of the user as part of the browser and accessed by merely a click on the icon.

The preferred embodiment is described in connection with the Internet and World Wide Web but is not limited to such application. The present invention may be readily applied to and implemented using conventional telecommunications networks, wireless communications networks, broadcast, satellite and cable systems or another functionally equivalent means of communication with users. The present invention may also be implemented in conjunction with technology that combines television and computers. Persons skilled in the art may apply the present invention to cable television, TiVo, Replay, or other network applications in which provides the user with some degree of control of the information it receives from or through that network.

While the invention has been particularly shown and described with reference to the preferred embodiments thereof, it will be understood by those skilled in the art that various changes in form and details may be made therein without departing from the spirit of the invention.

What is claimed is:

1. A method for generating a customized interface, comprising the steps of:
   associating in a computer one or more ads with each ad having a respective ad profile;
   associating in a computer one or more user profiles with each user profile created from information inputted by a corresponding user and transmitted to the computer, wherein each user personally assists in the creation of his or her user profile by knowingly inputting the information and is aware that the information will be used to create a customized interface for each user profile,
   determining matching ad profiles by comparing the ad profiles with user profiles for matches;
   selectively including in the interface of a user at least one of the one or more ads associated with the ad profiles matching a user profile created from the information provided by the user; and
   formatting the interface in accordance with the user profile;
   wherein the user profile defines an amount of space on the interface, the method further comprising the step of formatting the interface such that the one or more ads included in the interface are restricted to the amount of space defined in the user profile.

2. The method of claim 1, further comprising the step of excluding from the interface any ads associated with an ad profile not matching the user profile.

3. The method of claim 1, wherein the user profile for each user is created from and solely based on information knowingly provided by each user.

4. The method of claim 1, further comprising the step of including in the interface ads that are related to one or more favorite category of products or services specified in the information provided by the user to create his or her user profile.

5. The method of claim 1, wherein the user profile defines a list of one or more advertisers, the method further comprising the step of including in the interface only those ads that are associated with the advertisers listed in the user profile.

6. The method of claim 1, wherein the user profile defines a framework, the method further comprising the step of formatting the interface in accordance with the framework defined in the user profile.

7. The method of claim 1, further comprising the step of generating the interface in real time.

8. The method of claim 1, further comprising the step of storing statistical data determined according to the user's activity at the interface.

9. The method of claim 8, further comprising the step of charging an advertiser of the ads having a matching profile in accordance with the statistical data.

10. The method of claim 1, further comprising the step of charging an advertiser of the ads having a matching profile in accordance with the matches.

11. The method of claim 10, wherein the charging step comprises charging the advertiser in accordance with the number of users having matching user profiles.

12. The method of claim 11, wherein the charging step comprises charging the advertiser as a function of amount of space available for presenting the ad to the users.

13. The method of claim 12, wherein the charging step comprises charging the advertiser according to the number of users to whom the ad was sent.

14. The method of claim 13, wherein the charging step comprises charging the advertiser an amount determined according to a function of when the user receives the ad.

15. The method of claim 1, wherein the ad profile contains information about a targeted audience for the ad.

16. The method of claim 1, further comprising the step of including the ad in the interface on condition that the user profile is consistent with the targeted audience and the inclusion of the ad is consistent with the user profile.

17. A method for generating a customized interface, comprising the steps of:
   associating in a computer one or more ads with each ad having a respective ad profile;
   associating in a computer one or more user profiles with each user profile created from information inputted by a corresponding user and transmitted to the computer, wherein each user personally assists in the creation of his or her user profile by knowingly inputting the information and is aware that the information will be used to create a customized interface for each user profile, determining matching ad profiles by comparing the ad profiles with user profiles for matches;

selectively including in the interface of a user at least one of the one or more ads associated with the ad profiles matching a user profile created from the information provided by the user; and formatting the interface in accordance with the user profile; wherein the user profile defines an percentage of space on the interface, the method further comprising the step of formatting the interface such that the one or more ads included in the interface occupy no more space than the percentage defined in the user profile.

* * * * *